(12) United States Patent
Johnston et al.

(10) Patent No.: US 8,675,496 B2
(45) Date of Patent: Mar. 18, 2014

(54) METHOD AND APPARATUS FOR IDENTIFYING A PHYSICAL LINK INTERCONNECTING NETWORK DEVICES

(75) Inventors: Jay Kemper Johnston, Raleigh, NC (US); David C. White, Jr., Durham, NC (US); Christopher Blayne Dreier, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 13/368,613

(22) Filed: Feb. 8, 2012

(65) Prior Publication Data

US 2013/0201867 A1     Aug. 8, 2013

(51) Int. Cl.
*H04L 1/00*     (2006.01)
*G06F 15/173*   (2006.01)
*G01R 31/28*    (2006.01)

(52) U.S. Cl.
USPC ............................ 370/241; 709/223; 714/712

(58) Field of Classification Search
None
See application file for complete search history.

(56) References Cited

U.S. PATENT DOCUMENTS

| | | | |
|---|---|---|---|
| 6,434,716 B1 * | 8/2002 | Johnson et al. | 714/712 |
| 6,826,631 B2 * | 11/2004 | Webb | 710/6 |
| 7,701,880 B2 * | 4/2010 | Klein et al. | 370/255 |
| 8,082,368 B2 * | 12/2011 | Hsu et al. | 709/250 |
| 2004/0059806 A1 * | 3/2004 | Webb | 709/223 |
| 2008/0222532 A1 * | 9/2008 | Mester et al. | 715/738 |

* cited by examiner

*Primary Examiner* — Clemence Han
(74) *Attorney, Agent, or Firm* — Meunier Carlin & Curfman, LLC

(57) ABSTRACT

Methods and apparatuses for identifying a physical link interconnecting network devices and/or correlating a designation of an interface on a network device to a physical location of the interface on the network device are disclosed herein. A method for identifying a physical link interconnecting a network device and a peer network device, where the network device and the peer network device each have an interface and a corresponding indicating light, may include: sending a packet from the interface of the network device to the interface of the peer network device over the physical link; causing the indicating light corresponding to the interface of the peer network device to blink at a predetermined cadence for a predetermined period of time upon receipt of the packet to enable recognition of the peer network device.

22 Claims, 4 Drawing Sheets

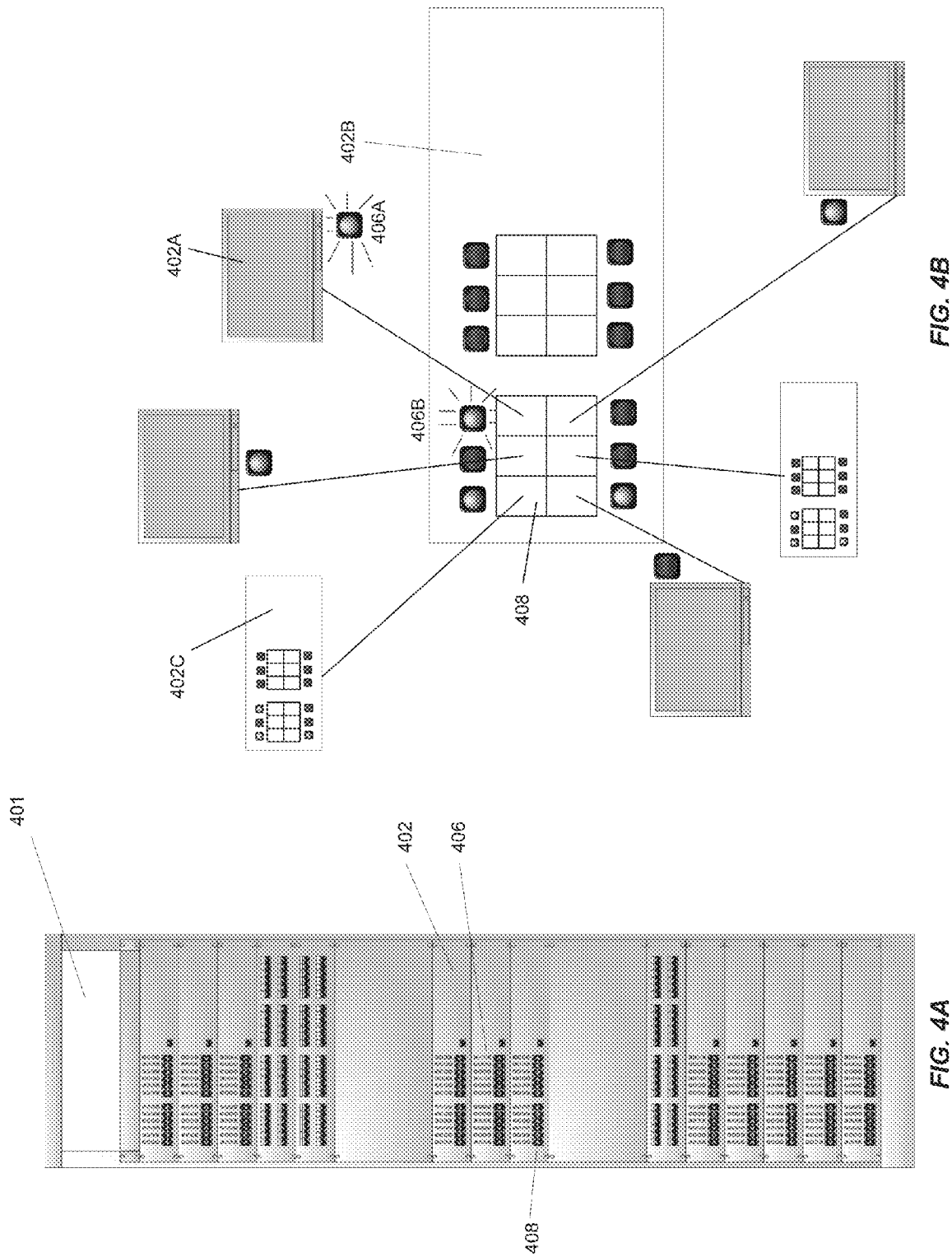

METHOD AND APPARATUS FOR IDENTIFYING A PHYSICAL LINK INTERCONNECTING NETWORK DEVICES

BACKGROUND

A network device may potentially have hundreds of independent, physical point-to-point connections linking it to other network devices. The sheer number of physical links makes it very difficult for an on-site network administrator to quickly identify which specific interface of the network device connects to a particular peer network device. For example, if an on-site network administrator is performing maintenance and identifies an interface on network device A and wishes to trace the connected cable to an interface on network device B, it may be difficult to follow the path of the cable due to wire routing and bundling. This is particularly true with regard to the "last leg" connection problem (i.e., identifying the last portion of the Ethernet connection on the way to a physical desktop device). Access layer switches often connect, via in-wall building structural wiring, to a cubicle patch-panel where the desktop device is plugged in. Thus, if the network administrator needs to identify the switch port to which the desktop device is connected, it may be impossible to visually trace the cable, and it may also be difficult to isolate the switch port with tone probes.

In addition, remotely-located network engineers commonly work on network problems with customers by remotely accessing a network device's command line interface (i.e., via a remote screen-sharing session, for example). If the support engineers suspect that the customer's network problem might stem from a physical cabling issue, the support engineers can only ask their end customer to verify that the cable is plugged into the correct device, and the support engineers have no way to verify that the task was completed correctly. Unfortunately, in some cases, the customer may not be able to physically follow the cable to the peer device, due to the wire routing or cable bundling for example, to verify that it is plugged into the correct port. This makes troubleshooting more difficult for both the customer and the remotely-located network support engineers.

Further, identifying the correlation between the software configuration's designation of a physical interface (e.g., interface Ethernet4/30) and how that maps to the actual physical location of the interface on the network device can be challenging. For example, it may be challenging or impossible for an on-site network administrator to collaborate with a remotely-located administrator to determine which cable to unplug or plug-in when the physical interface number is not clearly marked on the chassis or line card or when the placement of the interface makes determining the actual interface slot number and port number ambiguous. Accordingly, a solution is needed to more easily identify the cable port endpoints between connected network devices.

SUMMARY

Methods and apparatuses for identifying a physical link interconnecting network devices and/or correlating a designation of an interface on a network device to a physical location of the interface on the network device are disclosed herein. A method for identifying a physical link interconnecting a network device and a peer network device, where the network device and the peer network device each have an interface and a corresponding indicating light, may include: sending a packet from the interface of the network device to the interface of the peer network device over the physical link; causing the indicating light corresponding to the interface of the peer network device to blink at a predetermined cadence for a predetermined period of time upon receipt of the packet to enable recognition of the interface to which the physical link is connected on the peer network device.

Optionally, the method may also include causing the indicating light corresponding to the interface of the network device to blink at the predetermined cadence for the predetermined period of time upon sending the packet. In some implementations, the predetermined cadence may include turning the indicating light ON five times per second. Alternatively or additionally, the predetermined cadence may include turning the indicating light ON for a period of 100 ms every 200 ms.

In another implementation, the method may include repeatedly sending a packet from the interface of the network device to the interface of the peer network device over the physical link every predetermined time interval.

Optionally, the predetermined time interval between packets sent to the peer device may be 1 second.

In addition, the predetermined period of time during which the indicating light blinks may be set by each packet sent from the interface of the network device to the interface of the peer network device over the physical link.

In yet another implementation, the packet may be a Layer-2 packet including a Layer-2 multicast address.

The method may also include receiving an acknowledgment to the packet from the interface of the peer network device at the interface of the network device over the physical link, the acknowledgment may include at least one of identification of the peer device, identification of the interface of the peer device and an amount of time remaining in the predetermined period of time.

Alternatively or additionally, the method may also include displaying at least one of the identification of the peer device, the identification of the interface of the peer device and the amount of time remaining in the predetermined period of time.

A network device communicatively connected to an interface of a peer network device through a physical link according to an implementation of the invention may include: an interface that communicatively connects to the interface of the peer network device through the physical link; and a processor. The processor may be configured to send a packet from the interface of the network device to the interface of the peer network device over the physical link, wherein the packet causes an indicating light corresponding to the interface of the peer network device to blink at a predetermined cadence for a predetermined period of time upon receipt of the packet to enable recognition of the peer network device.

Optionally, the network device may include an indicating light corresponding to the interface. In addition, the packet may cause the indicating light corresponding to the interface to blink at the predetermined cadence for the predetermined period of time upon sending the packet.

In some implementations, the predetermined cadence may include turning the indicating light ON for a period of 100 ms every 200 ms. Alternatively or additionally, the predetermined cadence may include turning the indicating light ON for a period of 100 ms every 200 ms.

In yet another implementation, the processor may also be configured to repeatedly send a packet from the interface of the network device to the interface of the peer network device over the physical link every predetermined time interval. In addition, the predetermined period of time may be set by each packet sent from the interface of the network device to the interface of the peer network device over the physical link.

In addition, the packet may be a Layer-2 packet including a Layer-2 multicast address.

Optionally, the processor may also be configured to receive an acknowledgment to the packet from the interface of the peer network device over the physical link, the acknowledgment may include at least one of identification of the peer device, identification of the interface of the peer device and an amount of time remaining in the predetermined period of time.

Alternatively or additionally, the network device may include a display. The processor may also be configured to display at least one of the identification of the peer device, the identification of the interface of the peer device and the amount of time remaining in the predetermined period of time on the display.

A method of correlating an address of an interface of a network device to a physical location of the interface of the network device according to an implementation of the invention may include: generating a packet at the network device; causing an indicating light corresponding to the interface of the network device to blink at a predetermined cadence for a predetermined period of time upon receipt of the packet; and correlating the address of the interface of the network device to the physical location of the network device by recognizing the predetermined cadence.

Optionally, the predetermined cadence may include turning the indicating light ON for a period of 100 ms every 200 ms.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4A illustrates an example network rack according to an implementation of the invention; and FIG. 4B illustrates a simplified block diagram of interconnected network devices according to an implementation of the invention.

DETAILED DESCRIPTION

Figure 1:
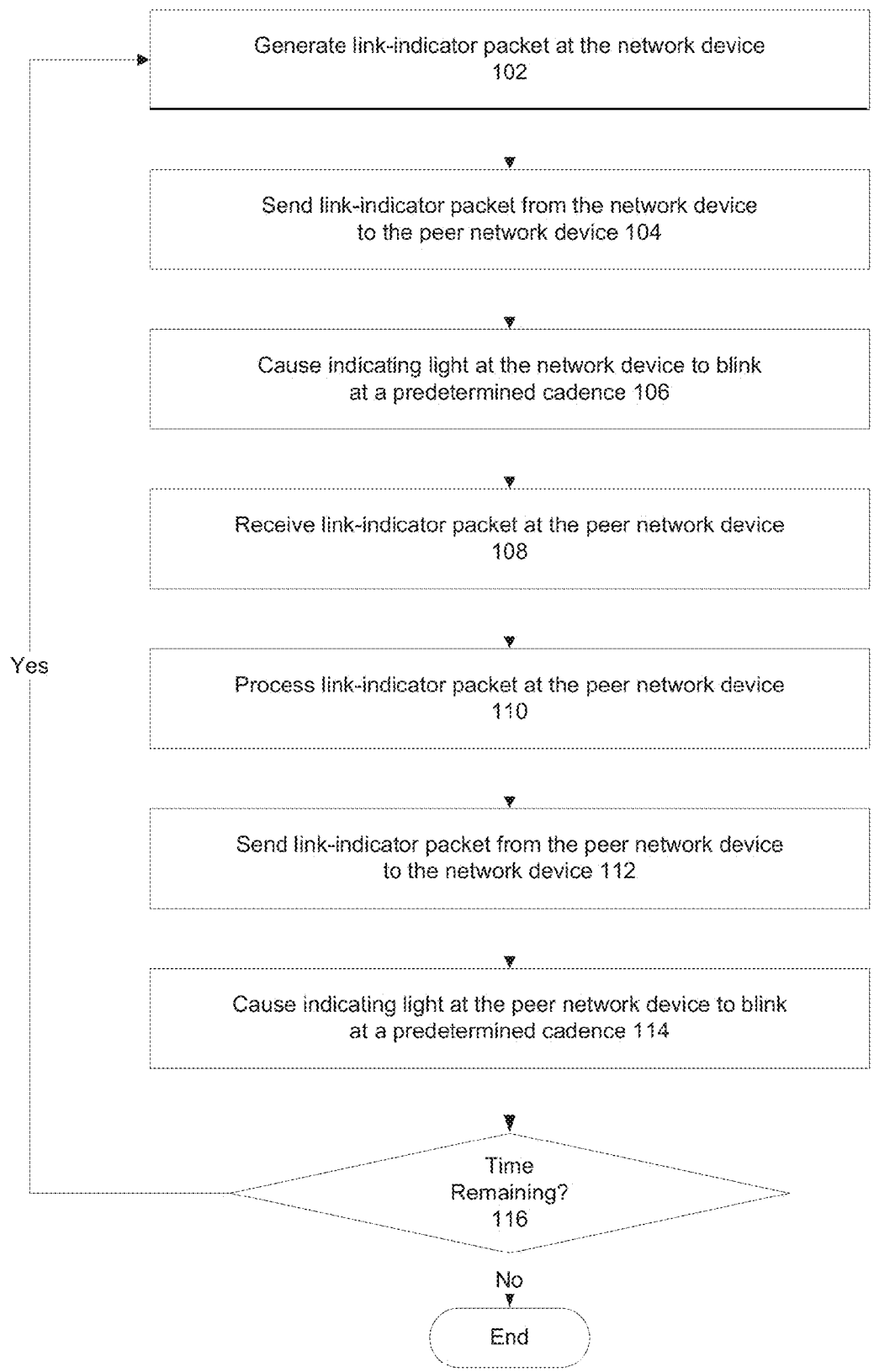
FIG. 1 illustrates an example flow diagram of a method for identifying a physical link interconnecting network devices according to an implementation of the invention.

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for identifying a physical link interconnecting network devices and/or correlating a designation of an interface on a network device to a physical location of the interface on the network device, it will become evident to those skilled in the art that the implementations are not limited thereto, but are applicable for identifying a physical link interconnecting any type of computing device and/or correlating a designation of an interface on a computing device to a physical location of the interface on the computing device.

Various methods and apparatuses for identifying a physical link interconnecting network devices and/or correlating a designation of an interface on a network device to a physical location of the interface on the network device are described herein. According to some implementations, the methods aid a user, such as a network administrator, in identifying the physical link connecting interfaces of two network devices by causing indicating lights corresponding to the interfaces on each respective network controller to blink at easily recognizable, repeating intervals for a predetermined period of time. For example, a network administrator, who may be on- or off-site, may cause an indicating light corresponding to a specific interface of the network device to begin blinking at easily recognizable, repeating intervals and send packets out of the same interface over the physical link. When the packets are received and recognized at a physically adjacent interface of a peer network device, an indicating light corresponding to the physically adjacent interface of the peer network device may also begin blinking at easily recognizable, repeating intervals. Accordingly, the respective indicating lights of the interfaces connected by the physical link may simultaneously blink at easily recognizable, repeating intervals, which allows the network administrator to identify the specific interfaces, as well as the specific physical link, interconnecting the network devices.

The methods discussed above are particularly useful when network operations teams are dealing with changes to physical network topologies where tens or hundreds of physical network links or connections (i.e., cables) terminate on a single network device. Specifically, the methods identify exactly which two network interfaces, and therefore which physical link, interconnect two network devices. Thus, the methods reduce the chance that physical actions such as plugging and/or unplugging cables might be taken on the wrong interface, resulting in unintended network changes.

Further, in data-center environments, the network administrators managing the cabling and network interfaces may be at a different physical location than the network administrators configuring the software settings on the devices. Coordination between these two groups of network administrators, one of which may be physically located on-site and the other may be located off-site, when performing network maintenance (i.e., adding a new link between two network devices or removing a link, for example) is challenging. Thus, the methods discussed above allow the off-site software configuration administrators to explicitly indicate to the on-site network administrators the interfaces on which to perform maintenance, which removes any ambiguity and confusion regarding the interfaces interconnecting the two network devices.

In other implementations, the methods may aid the network administrators in correlating a designation of an interface on a network device to a physical location of the interface on the network device. For example, the network administrators may instruct an indicating light corresponding to a specific interface of the network device to begin blinking at easily recognizable, repeating intervals. Accordingly, the methods facilitate identification of the physical location of the interface of the network device.

The methods discussed above are particularly useful when off-site network administrators suspect on-site cabling issues. For example, in the event that on-site network administrators have plugged networking cables into the wrong interface of a network device, the off-site network administrators may remotely access the network device (i.e., via a remote screen-sharing session, for example) and correlate the address of the interface of the network device to the physical location of the interface of the network device by instructing the interface to blink at easily recognizable, repeating intervals. The methods discussed above may also be useful when there is no cable plugged in to the interface because the network administrators may instruct the interface to blink at easily recognizable, repeating intervals in order to indicate the interface into which the cable must be plugged.

FIG. 1 illustrates an example flow diagram of a method for identifying a physical link interconnecting network devices according to an implementation of the invention. At 102, a link-indicator packet is generated at the network device. For example, the command line interface ("CLI") or the graphical user interface ("GUI") administration tool of the network device may be used to generate the link-indicator packet. The link-indicator packet may be a Layer-2 packet, for example. To enable the method on the specific interface, the specific interface of the network device may be specified, which may cause an indicating light corresponding to the specific interface of the network device to blink at easily recognizable, repeating intervals (i.e., a predetermined cadence) and send packets out the specific interface over the physical link. In some implementations, the indicating light corresponding to the specific interface of the network device may be an LED located adjacent to the specific interface of the network device, for example.

The specific interface of the network device, as well as an amount of time during which the method will be enabled on the specific interface of a network device, may preferably be specified in the CLI when enabling the method. Particularly, an example CLI may be:
router# link-indicator<interface>[<minutes>]
In the event that the amount of time is not specified (i.e., the [<minutes.] field is left blank), the method may be enabled for a default duration of time such as 15 minutes, for example. However, the default duration of time may be shorter or longer than 15 minutes and may be set by the manufacturer of the network device.

Example CLIs for enabling and disabling the method on the specific interface of the network device are described below:
(1)
router# link-indicator GigabitEthernet1/4 30
(2)
router# link-indicator GigabitEthernet2/3
(3)
router# no link-indicator GigabitEthernet5/3
In (1), the method is enabled on GigabitEthernet1/4 for a period of 30 minutes. In (2), the method is enabled on GigabitEthernet2/3 for the default period (i.e., 15 minutes, for example). As discussed above, when the amount of time is not specified, the method may be automatically enabled for the default period of time. In (3), the method is disabled on GigabitEthernet5/3 by specifying "no" before the specific interface of the network device. This may be performed to disable the method before expiration of the specified amount of time, for example.

Once the method is enabled on the specific interface of the network device, the network device sends the link-indicator packet out of the specific interface over the physical link at 104, and an indicating light corresponding to the specific interface of the network device begins to blink at the predetermined cadence at 106. As discussed above, the link-indicator packet may be a Layer-2 packet. In addition, the link-indicator packet may have a destination Layer-2 multicast address.

The predetermined cadence may be any easily recognizable, repeating pattern. Preferably, the predetermined cadence should be distinguishable among other randomly blinking indicating lights such as indicating lights that blink due to network traffic on the interfaces of the network device, for example. In one implementation, the predetermined cadence may be 5 times per second. In other words, the indicating light corresponding to the specific interface of the network device may be turned ON 5 times every second. Alternatively or additionally, the indicating light corresponding to the specific interface of the network device may be turned ON for a period of 100 ms and then turned OFF for a period of 100 ms. This pattern may be repeated such that the indicating light corresponding to the specific interface of the network device is turned ON 5 times every second.

In one study, it was found this pattern (i.e., 100 ms ON followed by 100 ms OFF) to be the most recognizable pattern. Specifically, the study found that users were able to easily recognize this pattern among a row of randomly blinking indicating lights. In the study, most users were not informed of this pattern beforehand, and instead, the users were able to recognize and identify this pattern among the randomly blinking indicating lights. However, as discussed above, any easily recognizable, repeating pattern may be utilized as long as it may be distinguished from other randomly blinking indicating lights.

As discussed above, once the method is activated on the specific interface of the network device, the network device sends the link-indicator packet out of the specific interface at 104, and the indicating light corresponding to the specific interface of the network device begins to blink at the predetermined cadence at 106. Optionally, the network device may send the link-indicator packet out of the specific interface of the network device every predetermined time interval. In some implementations, the network device may send the link-indicator packet every 1 second, for example. However, the predetermined time interval is not limited to 1 second, and instead, the predetermined time interval may be a different length of time. Thereafter, at 108, the link-indicator packet is received at an interface of a peer network device, which is connected to the specific interface of the network device through the physical link. At 110, due to the layer-2 destination multicast address of the link-indicator packet, the peer network device processes the link-indicator packet, which enables the method on the peer network device.

At 112, the peer network device generates and sends a link-indicator packet back out of the interface of the peer network device over the physical link, and at 114, an indicating light corresponding to the interface of the peer network device begins to blink at the predetermined cadence. Accordingly, when the method is enabled on both the network device and the peer network device both "ends" of the physical link interconnecting the two devices (i.e., indicating lights corresponding to the interconnected interfaces) are blinking at the same predetermined cadence. This makes it easier for the network administrator to recognize which specific interfaces are providing connectivity and interconnecting the network devices.

In the event that it is not possible to enable the link-identity method on the peer network device (i.e., when the link-identity method is not supported by the peer network device), the peer network device may handle the link-indicator packets similarly to other Layer-2 multicast packets. For example, the link-indicator packets may be forwarded to other ports on the VLAN (i.e., when received on a Layer-2 switched port or a hub) or dropped per the multicast traffic forwarding policy. When the peer network device is a Layer-2 switch or a hub, multiple network devices that are Layer-2 adjacent may enable the link-identity method, and indicating lights corresponding to interfaces of these network devices may begin to blink at the predetermined cadence.

Alternatively or additionally, the network device may set the amount of time during which the method will be enabled on the connected network devices. In the absence of the method being expressly disabled by the network device, the method may remain enabled on the network device and the peer network device until the amount of time expires. This is shown at 116 in FIG. 1. For example, the network device may set a time value in each link-indicator packet it sends, and the network device may decrement the time value in each subsequent link-indicator packet. If the network device sends the link-indicator packet every 1 second, then the network device will decrement the time value by 1 second in each subsequent link-indicator packet. In the event that the network device disappears (i.e., due to power failure or crash on the network device, for example), the method remains enabled on the peer network device until the timeout is reached. When the network device returns (i.e., following the power failure or crash), the next link-indicator packet received by the peer network device causes the method to be enabled for the time specified in the link-indicator packet.

The link-indicator packet may be included in a frame including additional information related to the network device. For example, the link-indicator frame may include several Time, Length, Value ("TLV") fields that provide identification of the network device (i.e., a hostname), identification of the specific interface of the network device (i.e., an interface identifier such as GigabitEthernet0/1), a status (i.e., enabled or disabled), a role (i.e., initiator or receiver), the time value, etc. Similarly, the peer network device may also send link-indicator frames including additional information related to the peer network device. The information contained within the link-indicator frames may be utilized for displaying information related to the network device and the peer network device.

An example link-indicator frame according to an implementation of the invention is described below:

FRAME FORMAT
Packet Format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Version       | Time-to-Live  | Checksum                      |
+-+-+-+-+-+-+-+-+-+-+-+-+-+-+-+-+-+-+-+-+-+-+-+-+-+-+-+-+-+-+-+-+
| List of TLVs (variable length list)                            |
+-+-+-+-+-+-+-+-+-+-+-+-+-+-+-+-+-+-+-+-+-+-+-+-+-+-+-+-+-+-+-+-+
```

Version (8 bits): Link Indicator v1-0x01
Time-to-live (8-bits): The length of time in seconds that the receiving network device should keep the information in the packet.
Checksum (16-bits): This may be the 1's complement of the 1's complement sum. The standard IP checksum, with the modification that the odd byte at the end of an odd length message may be used as the signed low 8 bits of an extra word, rather than as the unsigned high 8 bits.

TLV Format:

```
 0                   1                   2                   3
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+-
| Type                          | Length                         |
+-+-+-+-+-+-+-+-+-+-+-+-+-+-+-+-+-+-+-+-+-+-+-+-+-+-+-+-+-+-+-+-+-
| Value   (variable length)                                       |
+-+-+-+-+-+-+-+-+-+-+-+-+-+-+-+-+-+-+-+-+-+-+-+-+-+-+-+-+-+-+-+-+-
```

Type (16-bits): Well known values defined below. If a network device does not understand a Type value, it may skip over it using the length field.
Length (16-bits): Length in bytes of the Type, Length, and Value fields.
Device-ID TLV: 0x0001
May identify the hostname of the network device sending the frame. This may be in the form of a character string. The TLV length determines the length of the string. The maximum size of the Value may be 500 bytes in order to avoid the possibility that the link-indicator packet might exceed 1500 bytes and be fragmented. For example, the largest hostname size configurable on switches manufactured by CISCO SYSTEMS, INC., San Jose, Calif. is 245 characters, which is well below this limit.
Interface TLV: 0x0002
May identify the name of the specific interface of the network device. This may be in the form of a character string. The TLV length determines the length of the string. The maximum size of the Value may be 500 bytes in order to avoid the possibility that the link-indicator packet might exceed 1500 bytes and be fragmented, as discussed above.
Status TLV: 0x0003
May indicate the status of the feature. For example, the length may always be 1 bit.
Particularly, the value may be either "1" to indicate that the feature is enabled, and should be immediately enabled on the peer network device, or "0" to indicate that the feature is disabled, and should be immediately disabled on the peer network device.
Role TLV: 0x0004
May indicate if the network device is the initiator or the receiver of the feature. The length may always be 1 bit. Particularly, the value may be either "1" to indicate that the network device initiated the feature and sent the packet or "0" to indicate that the network device received the packet from the network device.
Time TLV: 0x0005
May indicate the number of seconds remaining until the feature should be de-activated. This may be in the form of an integer. As discussed above, the time value may be set by the initiator network device and may be decremented with each subsequent packet sent until the value is 0, at which point the Status TLV is set to 0 and the feature is disabled. The TLV length field may always be set to 2 bytes. Thus, the maximum number of seconds for enabling the feature is 2^16 or 65536 seconds (18.204 hours).

As discussed above, the information contained within the link-indicator frames may be utilized for displaying information related to the network device and the peer network device. In some implementations, information related to the network devices may be displayed using a show link-indicator feature on a graphical display of a network device. Optionally, the information may not be displayed until a valid link-indicator packet is received from the receiving network device by the initiating network device. This feature may be implemented using the CLI or the GUI administration tool. Example CLIs for showing information related to the network devices are described below:

(1)

```
router# show link-indicator
Ports with Link-indicator enabled blink with a frequency of 200 ms (5 times per second)
Local interface GigabitEthernet1/4 (up/up)
Interface Role: Initiator
Peer hostname: BDX-6509-4
Peer status: Receiver
Peer interface: GigabitEthernet7/47
Time remaining: 0:28:22
Local interface GigabitEthernet2/3 (up/up)
Interface Role: Initiator
Peer hostname: Unknown
Peer status: Unknown
Peer interface: Unknown
Time remaining: 0:04:43
router#
```

(2)

```
router# show link-indicator
Ports with Link-indicator enabled blink with a frequency of 200 ms (5 times per second)
Local interface GigabitEthernet4/4 (up/up)
Interface Role: Initiator
Peer hostname: BDX-6509-4
Peer status: Receiver
Peer interface: GigabitEthernet7/47
Time remaining: 0:28:22
Peer hostname: ZFX-6506-2
Peer status: Receiver
Peer interface: FastEthernet3/4
Time remaining: 0:28:22
Peer hostname: ResearchGroup-3500
Peer status: Receiver
Peer interface: FastEthernet0/22
Time remaining: 0:28:22
router#
```

In (1), information regarding all of the active interfaces is displayed. In (2), the initiator network device was plugged into a hub, and two additional receiving network devices responded with link-indicator packets.

In some cases, the maximum transmission unit ("MTU") of an interface may be lower than the size of the link-indicator frame, and the size of the link-indicator frame should be dynamically reduced to allow the link-indicator frame to be sent without the need for fragmentation. For example, the variable length TLVs representing identification of the device and identification of the interface may be reduced to 30 characters each. If the link-indicator frame still cannot be transmitted due to the MTU even after truncating the TLVs representing identification of the device and identification of the interface, only the TLV representing identification of the interface may be transmitted. If the link-indicator frame is still too large to transmit when either the TLV representing identification of the device or the TLV representing identification of the interface is included, both may be omitted. In this case, the receiving network device may interpret this as a special case of low-MTU on the initiator network device. An example CLI when the initiator interface MTU is too low to transmit TLVs representing identification of the device and identification of the interface is described below:

```
router# show link-indicator
Ports with Link-indicator enabled blink with a frequency of 200 ms (5 times per second)
Local interface GigabitEthernet1/4 (up/up)
Interface Role: Initiator
Peer hostname: Unknown (MTU too low)
Peer status: Receiver
Peer interface: Unknown (MTU too low)
Time remaining: 0:28:22
router#
```

Figure 2:
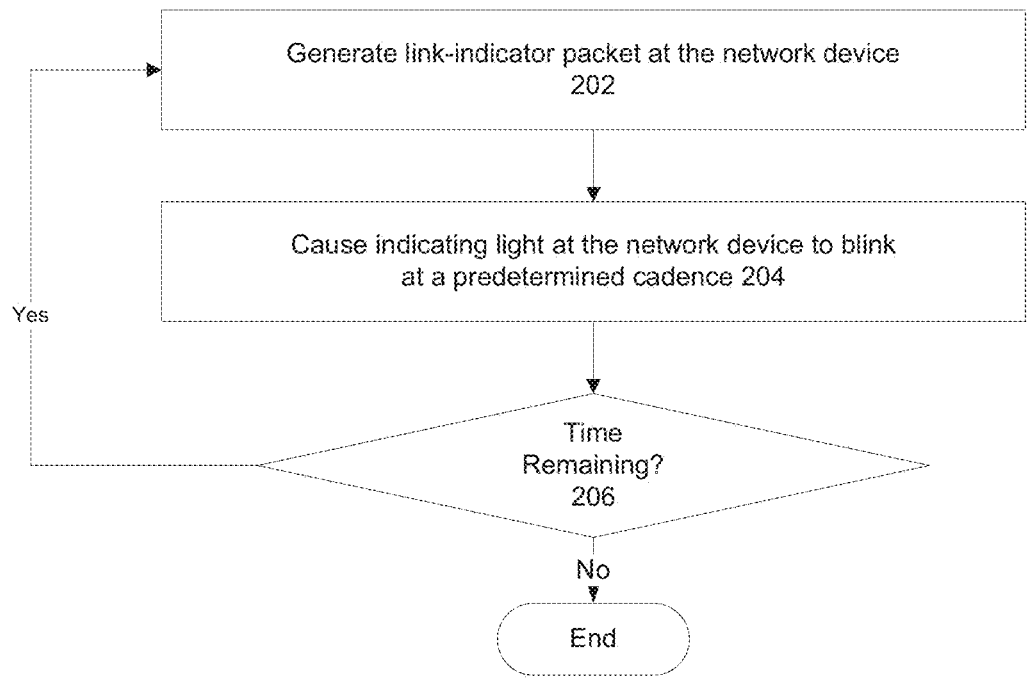
FIG. 2 illustrates an example flow diagram of a method for correlating a designation of an interface on a network device to a physical location of the interface on the network device according to an implementation of the invention.

FIG. 2 illustrates an example flow diagram of a method for correlating a designation of an interface on a network device to a physical location of the interface on the network device according to an implementation of the invention. Similarly to above, the CLI or the GUI administration tool of the network device may be used to generate the link-indicator packet at 202 to enable the method. The link-indicator packet may be a Layer-2 packet, for example. To enable the method on the specific interface, the specific interface of the network device may be specified, which may cause an indicating light corresponding to the specific interface of the network device to blink at easily recognizable, repeating intervals (i.e., the predetermined cadence). Once the method is enabled on the specific interface of the network device, the indicating light corresponding to the specific interface of the network device begins to blink at the predetermined cadence at 204. In the absence of the method being expressly disabled by the network device, the method may remain enabled on the network device until the amount of time expires. This is shown at 206 in FIG. 2. According to the above method, it may be easier for the network administrator to correlate a designation of an interface on a network device to a physical location of the interface on the network device because an indicating light corresponding to the specific interface of the network device blinks at easily recognizable, repeating intervals.

Figure 3:
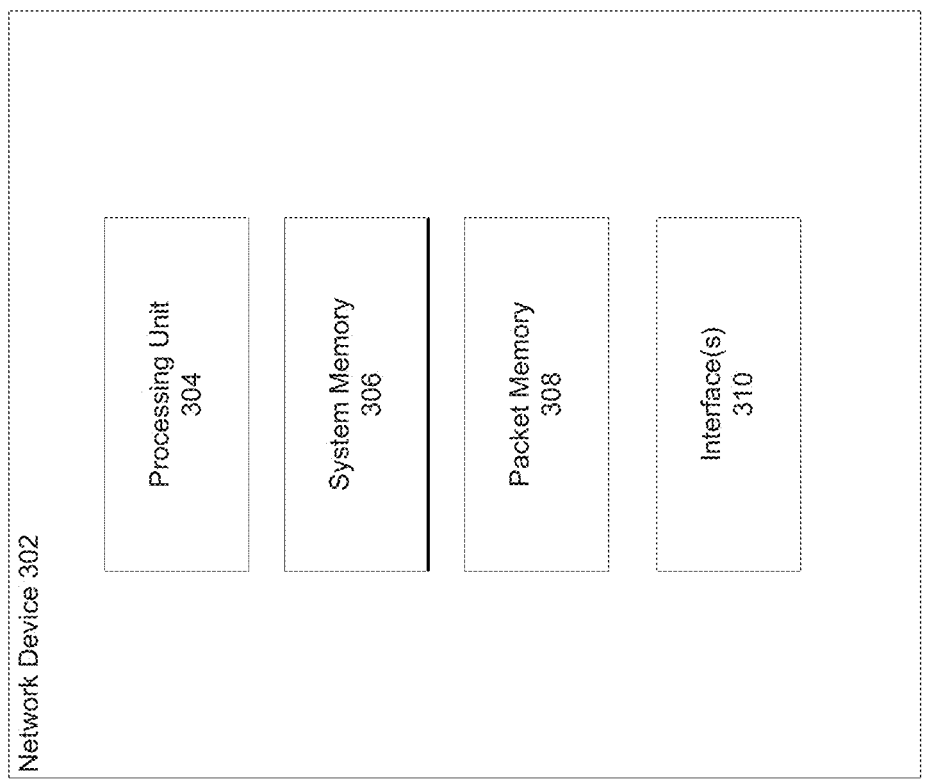
FIG. 3 illustrates a simplified block diagram of a network device according to an implementation of the invention.

FIG. 3 illustrates a simplified block diagram of a network device 302 according to an implementation of the invention. The network device 302 may be a switch, a router, a hub, a computer, etc., for example. FIG. 4A illustrates an example network rack 401 according to an embodiment of the invention, and FIG. 4B illustrates a simplified block diagram of interconnected network devices operating within the environment of FIG. 1. In FIG. 4A, the network rack 401 may include a plurality of network devices 402, such as switches, hubs, patch panels, etc. Each network device 402 (i.e., a switch) may include a plurality of ports 408 and a plurality of corresponding indicating lights 406. In FIG. 4B, a network device 402B (i.e., a switch, for example) is interconnected with a plurality of network devices 402A and 402C (i.e., computers and other switches, for example). Each network device 402A is connected via a port on the network device 402A to a port 408 on the network device 402B. Accordingly, it may be difficult to identify the specific physical link interconnecting the network devices due the large number of connections. As shown in FIG. 4B, the link-indicator feature may be implemented such that the indicating light 406A corresponding to the port of the network device 402A and the indicating light 406B of the network device 402B blink at the predetermined cadence. In FIG. 4B, the indicating lights 406A and 406B are shown as illuminated and blinking with the same time pattern simultaneously. The remaining indicating lights corresponding to ports of network devices on which the link-indicator feature is not enabled may blink at random intervals, which is illustrated by showing the indicating lights of the respective interconnected ports not being illuminated simultaneously.

This allows the network administrator to more easily identify the ports, as well as the cable, interconnecting the network devices 402A and 402B by recognizing the predetermined cadence.

The network device 302 may be configured to implement the link-indicator features discussed above using hardware, software, firmware, or, where appropriate, combinations thereof. The network device 302 may include a processing unit 304, system memory 306, packet memory 308 and one or more interfaces 310, for example. The processing unit 304 may be a standard programmable processor that performs arithmetic and logic operations necessary for operation of the network device 302. The processing unit 304 may be configured to execute program code encoded in tangible, computer-readable media. For example, the processing unit 304 may execute program code stored in the system memory 306, which may be volatile or non-volatile memory. The system memory 306 is only one example of tangible, computer-readable media. Other examples of tangible, computer-readable media include floppy disks, CD-ROMs, DVDs, hard drives, flash memory, or any other machine-readable storage media, wherein when the program code is loaded into and executed by a machine, such as the network device 302, the machine becomes an apparatus for practicing the disclosed subject matter.

The network device 302 may communicate with other network devices via one or more interfaces 310. Each of the interfaces 310 may include a plurality of interfaces for connecting with a network. Examples of interfaces include Ethernet interfaces, Gigabit Ethernet interfaces, DSL interfaces, SONET interfaces, etc. Interfaces interconnecting network devices may be linked via a physical link, which may be any type of cable utilized to connect a network device to a network such as copper wire or fiber-optic cables, for example. As packets are received, processed and forwarded by the network device 302, the network device 302 may store the packets in the packet memory 308. Optionally, each of the interfaces 310 may include its own dedicated processing unit and memory, similarly to those discussed above. One skilled in the art would understand that the network device 302 shown in FIG. 3 and described above is only one example and that different configurations of the network device may be utilized.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for identifying a physical link interconnecting a network device and a peer network device, the network device and the peer network device each having an interface and a corresponding indicating light, the method comprising:
    sending a packet from the interface of the network device to the interface of the peer network device over the physical link; and
    causing the indicating light corresponding to the interface of the peer network device to blink at a predetermined cadence for a predetermined period of time upon receipt of the packet to enable recognition of the interface of the peer network device to which the physical link is connected.

2. The method of claim 1, further comprising causing the indicating light corresponding to the interface of the network device to blink at the predetermined cadence for the predetermined period of time upon sending the packet.

3. The method of claim 2, wherein the predetermined cadence further comprises turning the indicating light corresponding to the interface of the network device or the interface of the peer network device ON five times per second.

4. The method of claim 2, wherein the predetermined cadence further comprises turning the indicating light corresponding to the interface of the network device or the interface of the peer network device ON for a period of 100 ms every 200 ms interval.

5. The method of claim 1, wherein sending a packet from the interface of the network device to the interface of the peer network device over the physical link further comprises repeatedly sending a packet from the interface of the network device to the interface of the peer network device over the physical link every predetermined time interval.

6. The method of claim 5, wherein the predetermined time interval is 1 second.

7. The method of claim 5, wherein the predetermined period of time is set by each packet sent from the interface of the network device to the interface of the peer network device over the physical link.

8. The method of claim 1, wherein the packet is a Layer-2 packet including a Layer-2 multicast address.

9. The method of claim 1, further comprising receiving an acknowledgment to the packet from the interface of the peer network device at the interface of the network device over the physical link, the acknowledgment including at least one of identification of the peer network device, identification of the interface of the peer network device and an amount of time remaining in the predetermined period of time.

10. The method of claim 9, further comprising displaying at least one of the identification of the peer network device, the identification of the interface of the peer network device and the amount of time remaining in the predetermined period of time.

11. A network device communicatively connected to an interface of a peer network device through a physical link, comprising:
    an interface that communicatively connects to the interface of the peer network device through the physical link; and
    a processor configured to:
        send a packet from the interface of the network device to the interface of the peer network device over the physical link, wherein the packet causes an indicating light corresponding to the interface of the peer network device to blink at a predetermined cadence for a predetermined period of time upon receipt of the packet to enable recognition of the interface of the peer network device to which the physical link is connected.

12. The network device of claim 11, further comprising an indicating light corresponding to the interface of the network device, wherein the packet causes the indicating light corresponding to the interface of the network device to blink at the predetermined cadence for the predetermined period of time upon sending the packet.

13. The network device of claim 12, wherein the predetermined cadence further comprises turning the indicating light corresponding to the interface of the network device or the interface of the peer network device ON for a period of 100 ms every 200 ms interval.

14. The network device of claim 11, wherein the processor is further configured to repeatedly send a packet from the interface of the network device to the interface of the peer network device over the physical link every predetermined time interval.

15. The network device of claim 14, wherein the predetermined period of time is set by each packet sent from the interface of the network device to the interface of the peer network device over the physical link.

16. The network device of claim 11, wherein the packet is a Layer-2 packet including a Layer-2 multicast address.

17. The network device of claim 11, wherein the processor is further configured to receive an acknowledgment to the packet from the interface of the peer network device over the physical link, the acknowledgment including at least one of identification of the peer network device, identification of the interface of the peer network device and an amount of time remaining in the predetermined period of time.

18. The network device of claim 11, further comprising a display, wherein the processor is further configured to display at least one of the identification of the peer network device, the identification of the interface of the peer network device and the amount of time remaining in the predetermined period of time on the display.

19. A method of correlating a designation of an interface on a network device to a physical location of the interface on the network device, the method comprising:
  generating a packet at the network device, the packet specifying the designation of the interface on the network device;
  causing an indicating light corresponding to the interface on the network device to blink at a predetermined cadence for a predetermined period of time upon generating the packet; and
  correlating the designation of the interface on the network device to the physical location of the interface on the network device by recognizing the predetermined cadence.

20. The method of claim 19, wherein the predetermined cadence further comprises turning the indicating light ON for a period of 100 ms every 200 ms interval.

21. A network device, comprising:
  an interface for receiving a physical link, the interface being arranged at a physical location on the network device;
  an indicating light corresponding to the interface arranged at the physical location on the network device; and
  a processor configured to:
    generate a packet at the network device, the packet specifying a designation of the interface on the network device; and
    cause the indicating light to blink at a predetermined cadence for a predetermined period of time upon generating the packet, wherein the indicating light blinking at the predetermined cadence enables recognition of a correlation between the designation of the interface on the network device and the physical location of the interface on the network device.

22. The network device of claim 21, wherein the predetermined cadence further comprises turning the indicating light ON for a period of 100 ms every 200 ms interval.

* * * * *